Aug. 14, 1928.
E. B. MABEE
1,680,299
MEANS FOR MOUNTING NEGATIVES FOR DIAGNOSES
Filed Nov. 30, 1923  2 Sheets-Sheet 1
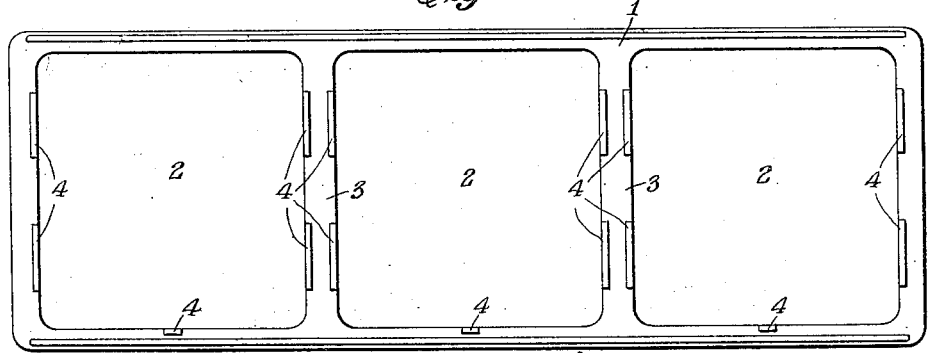
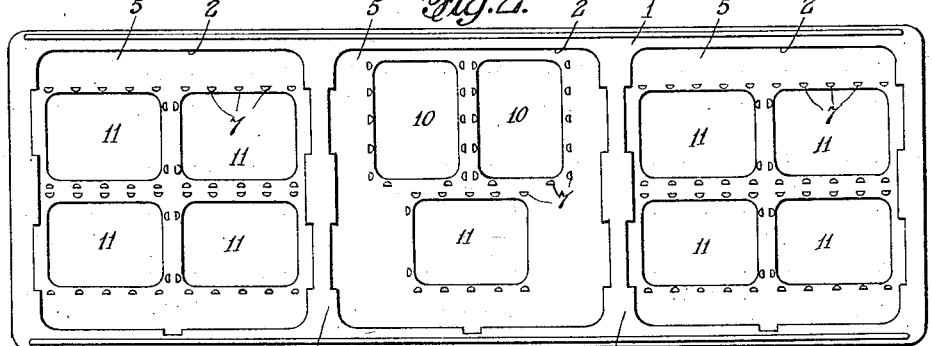
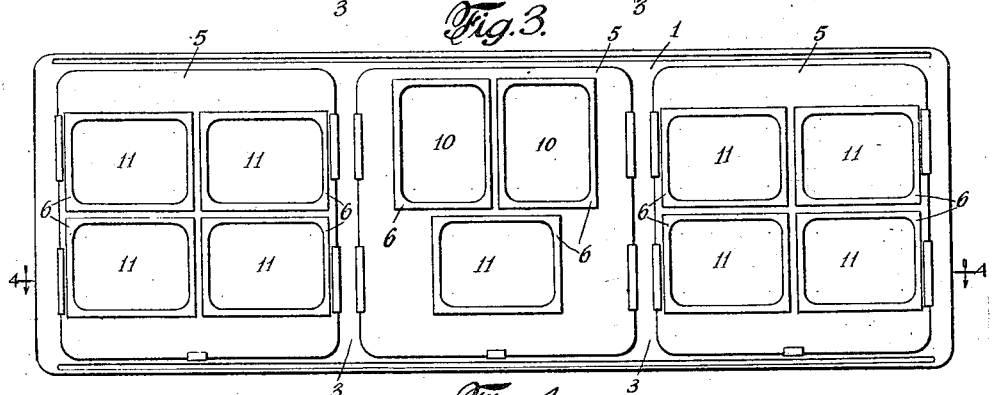
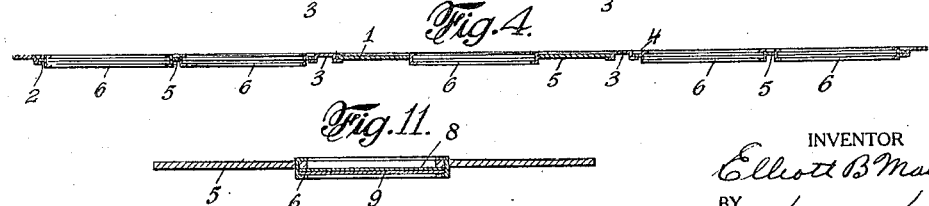
INVENTOR
Elliott B Mabee
BY Kenyon & Kenyon
ATTORNEYS Aug. 14, 1928.
E. B. MABEE
1,680,299
MEANS FOR MOUNTING NEGATIVES FOR DIAGNOSES
Filed Nov. 30, 1923     2 Sheets-Sheet 2
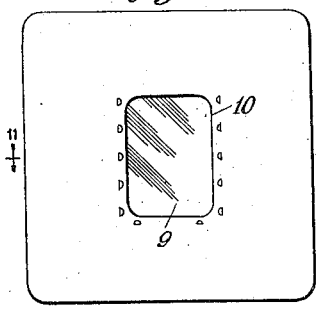
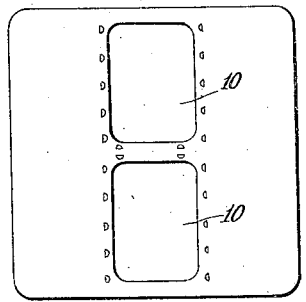
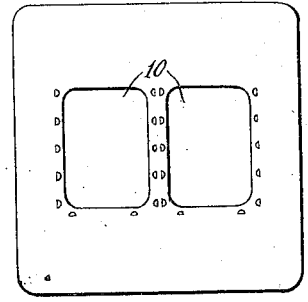
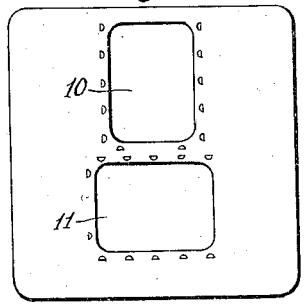
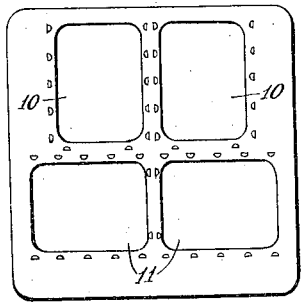
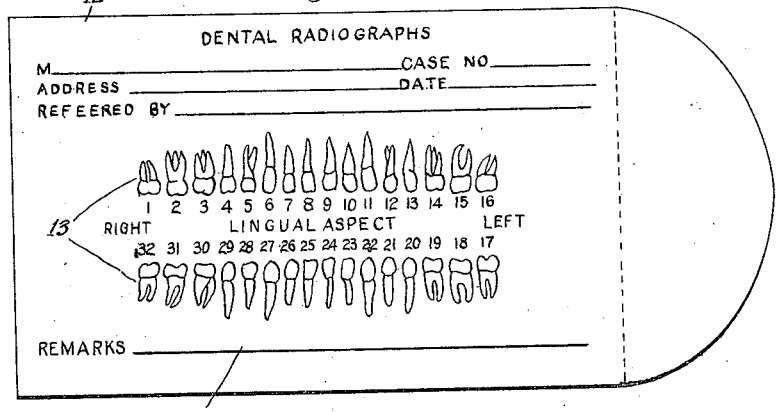
INVENTOR
Elliott B Mabee
BY
Kenyon & Kenyon
ATTORNEYS Patented Aug. 14, 1928.

1,680,299

UNITED STATES PATENT OFFICE.

ELLIOTT B. MABEE, OF BROOKLYN, NEW YORK.

MEANS FOR MOUNTING NEGATIVES FOR DIAGNOSES.

Application filed November 30, 1923. Serial No. 677,918.

My invention relates to new and improved means for mounting X-ray or other negatives while making a diagnosis, and in means for filing such negatives.

It is particularly adapted for the use of dentists and physicians in examining and filing dental radiographs, and comprises devices for mounting such radiographs while they are being examined for diagnosing purposes,—which devices are adapted to meet the varied requirements of such work, and are efficient, permanent and economic,— combined with improved, inexpensive, graphic-bearing means for both noting thereon the results of the diagnosis and for filing away such radiographs therein.

My invention is designed to do away with a long-standing practice among dental practitioners which I will now explain.

Practically ever since the X-ray began to be used in dentistry the practice has prevailed, and is now general, of mounting radiographs in a specially prepared pasteboard holder having windows cut therein in which the negatives are retained. This holder is then held before daylight or artificial light, and serves to hold the negatives while the examination or diagnosis is being made. A second series of negatives are similarly mounted, and, with the report of the diagnosis, frequently handed to the patient, the first pasteboard holder, with its contents, becoming a part of the doctor's records and being suitably inscribed and filed away.

This practice has many disadvantages. The holders are expensive, and it is necessary to have a large and miscellaneous stock of them on hand to meet the differing needs of varying cases. They are made in approximately sixty styles, having from one to eleven or more windows in them. In addition, the celluloid backs forming part of them are easily scratched, which renders them practically worthless for use in diagnoses.

Furthermore the holders are bulky to file, soil easily, and deteriorate rapidly when handled to any great extent. Another very serious disadvantage is that they do not remain flat but curl and buckle.

My invention does away with this cumbersome and expensive practice. It provides a permanent holder in which are compartments for the reception of mounts, a series of individual permanent mounts in which negatives, either singly or in groups, are adapted to be inserted, and in vertical or horizontal, or in both vertical and horizontal position, and filing means or envelopes bearing a pictorial representation of the human teeth, the advantage of all of which are fully set out hereinafter.

In the drawings forming part hereof, Figure 1 is a front view of the holder of my invention; Fig. 2 is a similar view showing three individual mounts inserted in the holder; Fig. 3 is a rear view of Fig. 2; Fig. 4 is a section on the line 4—4 of Fig. 3; Fig. 5 is a front elevation of an individual mount having one window in which are inserted a negative or radiograph, and a celluloid back; Figs. 6 to 9, inclusive, are views of mounts with differently shaped windows variously arranged; Fig. 10 is a front view of my filing envelope; Fig. 11 is a section on the line 11—11 of Fig. 5.

Similar reference characters refer to corresponding parts in the different figures.

Referring to the drawings, the numeral 1 designates my improved permanent holder. It is a frame made preferably of steel, treated so that it will not rust, and is provided with three openings or compartments, 2, 2, 2, separated by cross-bars 3, 3. Depressed portions 4 in the said frame and bars serve as guides and to hold in place the mounts 5, but they may be differently arranged, as, for instance, by having raised portions. These depressed portions are separated at their ends from the frame and form strips over which the mounts slide and between which and the frame of the holder they are separated and held in place.

The permanent mounts 5, also preferably of steel and similarly treated, are each made with one or more windows or openings. As shown in Fig. 3 each mount is provided on its rear side with a guideway 6 for each one of these windows, the parts 7 in the different figures being slight projections from said guideways extending through the front of mounts 5 and stamped back thereon to hold the said guideways in place. These guideways surround or frame the window or windows, and are open at one end, through which opening the negatives are slipped into place. Each opening is also usually equipped with a separable piece of frosted celluloid 8, although this is not an essential part of my invention. It is held in place by the guideway 6, and is removable and replaceable through the said openings, it being optional with the operator either to remove it or leave it in place back of the negative while the latter is under examination. When negatives are viewed with certain kinds of light more can be seen without than with the celluloid backs, but under other lights it is better to keep the celluloid in place. Both negative and celluloid are easily slipped into place and securely held. In Fig. 5 both negative and celluloid are in the mount, as shown clearly in cross-section of Fig. 11, the negative being indicated by 9.

In the drawings I have shown various types of mounts with vertical and horizontal windows and combinations of these. The vertical windows I have numbered 10 and the horizontal 11. It has been found necessary in the examination of radiographs to have a mount in which the negatives may be placed in any position, or combination of positions, desired, and my improvement has been devised with this in mind.

The need referred to is the result of the lack of uniformity in the formation of the human mouth. Owing to the peculiar formation of some mouths it is compulsory, particularly when radiographing anterior teeth, to place the film in the mouth in a vertical position. In the case of other patients it is necessary to position the film horizontally. In practically all cases it is necessary to take some radiographs in vertical and some in horizontal position. When the full mouth is being radiographed one patient will require more radiographs than another. My invention meets this situation in the practical art as it is flexible enough to cover all cases.

In Figs. 2 and 3 I have shown a possible combination of eleven negatives in one holder, all but two of the mounts being horizontal. Following the usual practice in this art the negatives would be mounted so that the centre ones would illustrate the teeth at the front of the mouth, that is, the superior and inferior, the negatives on the appropriate sides thereof showing left and right superior and inferior.

Fig. 5 illustrates a mount suitable for one vertically positioned negative, Fig. 6 for two vertically located one above the other, Fig. 7 for two positioned side by side, Fig. 8 for two with the lower horizontal and the upper vertical, and Fig. 9 for a combination of two lower horizontal and two upper vertical.

As the mounts are square it will be understood, of course, that when they are turned around, the mount of Fig. 5 becomes horizontal, Fig. 6 will show two in horizontal position side by side, those in Fig. 7 become two in horizontal position one over the other, in Fig. 8 one vertical and one horizontal side by side, and in Fig. 9 two vertical one over the other and two horizontal one over the other.

Heretofore, as stated above, it has been the practice to insert the negatives in a special pasteboard holder with openings or windows permanently fixed to accommodate the requisite horizontally or vertically exposed negatives in the combination required for the particular case, and after the examination or diagnosis, file them away in the same holder. My invention does away with the disadvantages incidental to this practice. My improved holder receives the mounts with their contained negatives to be examined, and when the examination is completed the negatives are removed, the holder and individual mounts are again ready for their intended work, and the negatives are taken care of by my improved filing means. In some cases it will not be necessary to utilize the holder. For instance, where the dentist or physician is examining from one to four negatives these can be examined in the proper mount without inserting them in the holder.

For filing I provide a specially prepared and printed receptacle such as envelope 12 illustrated in Fig. 10. It bears at 13 a representation of the thirty-two teeth of the human mouth, each tooth being numbered and shown in detail. This representation shows accurately not merely the surfaces but the parts of the teeth within the gum. The envelope also contains printed matter to indicate the identity of the person whose radiographs it contains, the date when the radiographs were taken, and a space, as at 14, for such remarks as the dentist or physician may wish to note in connection with the case. It will be obvious that the full illustration of the teeth provides a ready supplementary means for indicating,—by checking certain teeth or certain roots or parts thereof,—the salient points of the diagnosis, taken in conjunction with the remarks noted on the envelope in the space allotted for that purpose.

In practice my invention is carried out as follows. Where a single X-ray is required it does not matter whether the film is taken in vertical or in horizontal position, as the mount illustrated in Fig. 5 will accommodate it inasmuch as the mount is square. Should two negatives, however, be necessary, one of a tooth in the upper and one for a tooth in the lower jaw, the formation of the mouth of the patient determines whether the films are to be positioned vertically or horizontally. If taken vertically, they are placed in the mount illustrated in Fig. 6, if taken horizontally the mount of Fig. 7 is used, if taken in both positions the mount shown in Fig. 8 is called into play. But in the event that two X-ray films are taken of two different parts of either the upper or the lower jaw, by turning the mounts around this condition is taken care of, the negatives being then properly positioned.

After the diagnosis is completed and report made, the negatives are placed in one of my filing envelopes, the teeth affected are indicated thereon in any desired way, in connection with the remarks of the dentist or physician relating thereto, and filed away.

Should the patient desire a set of the negatives they are given to him in a second envelope appropriately prepared and marked.

The same procedure is of course followed in cases where a large number of negatives is required. Should the full mouth be radiographed, the negatives are placed in the mounts needed to set them in proper vertical or horizontal position, and inserted in the holder in logical order, so that they may be placed before daylight or artificial light and examined without changing the position of the holder.

From the foregoing it will be evident that my invention meets every need of the field which it is intended to cover. It provides a holder and mounts which are practically indestructible and will last indefinitely, and a type of envelope to be used in connection therewith which while serving for filing purposes embodies in itself means for graphically illustrating the results of a diagnosis noted thereon.

I have described my holder and mounts as "permanent" to indicate that they are designed and adapted to be used indefinitely and for all practical purposes "permanently" in connection with the examination of negatives, and to distinguish them from the paper or pasteboard mounts (also called holders) of the art which are used to contain negatives not only for examining but also for preserving and filing or recording the same.

I do not limit myself to the exact constructions shown herein, as various changes and modifications may be made therein without departing from the spirit of my invention or the scope of the claims appended hereto.

What I claim as new and desire to secure by Letters Patent, is:

1. The herein described means for the examination of negatives which comprise a holder in combination with a series of individual mounts provided with openings, the mounts being separately adjustable in the holder in a plurality of positions, means on the holder for retaining the mounts therein, and means on the mounts for retaining negatives in register with the openings in said mounts, substantially as and for the purpose set forth.

2. The herein-described means for the examination of negatives which comprise a permanent holder in combination with a series of permanent individual mounts adjustable therein in a plurality of positions, a plurality of oblong openings in each of the said mounts, the openings in said mounts which in one position of the mounts in the holder are vertical to the said holder, being in another position therein horizontal to the said holder, means on the holder for retaining the mounts therein, and means adjacent the openings in the mounts for retaining negatives therein substantially as set forth.

3. The herein-described means for the examination of radiographs during diagnosis which comprise a permanent rigid holder having openings therein, in combination with a series of permanent rigid individual mounts separately adjustable in two positions in said holder, a plurality of uniform oblong openings in each of the said mounts, each of said openings adapted to receive a single radiograph, the same opening in each of the said mounts being adapted in one position of the mount in the holder to display its contained radiograph horizontally of the holder, and in the second position thereof to display its contained radiograph vertically of the holder, according as the radiograph shows a horizontal or a vertical view, means on the holder to retain mounts therein, and means on the mounts to retain negatives therein, substantially as set forth.

4. The herein-described means for the examination of X-ray negatives which comprise a permanent rigid holder in combination with a series of permanent rigid individual mounts adjustable therein in a plurality of positions, uniform oblong openings in all of the said mounts each of which openings is fitted to receive a single negative, the same openings which are adapted to display negatives having vertical views being also adapted to display negatives having horizontal views, and the respective mounts independently adjustable in the holder so as to exhibit their contained vertical and horizontal negatives in the position in which they were taken in one position of the holder, the holder having means to hold the mounts in position therein and the mounts having means for holding negatives inserted in them, substantially as and for the purpose set forth.

5. The herein-described means for the examination of X-ray negatives which comprise a permanent metal holder in combination with a series of permanent metal mounts, the mounts adjustable in the holder in a plurality of positions, a plurality of openings in said holder and a plurality of openings in each of the said mounts, each of said openings in the holder adapted to contain a single mount and to present in said opening for examination a plurality of negatives contained in a single mount, the said mount adapted to display negatives in their correct position whether the views thereon are vertical or horizontal, the mount being placed in the holder in one position to exhibit negatives with vertical views and in another position in said holder to display negatives with horizontal views, means adjacent the openings in the holder to retain mounts therein, and the mounts having means adjacent their openings for retaining negatives therein, substantially as set forth.

In testimony whereof, I have signed my name to this specification.

ELLIOTT B. MABEE.